United States Patent
Karasawa

(10) Patent No.: US 6,735,211 B1
(45) Date of Patent: May 11, 2004

(54) PACKET COMMUNICATIONS CUSTOMER-STATION APPARATUS

(75) Inventor: Satoru Karasawa, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/532,030

(22) Filed: Mar. 21, 2000

(30) Foreign Application Priority Data

Oct. 7, 1999 (JP) .......................................... 11-286592

(51) Int. Cl.[7] .......................... H04L 12/28; H04L 12/56
(52) U.S. Cl. ........................ 370/412; 370/428; 370/537
(58) Field of Search .................................. 370/352, 379, 370/395.1, 401, 466, 901, 916, 412, 428, 535, 537, 538, 540, 395.2, 395.21, 395.4, 395.41, 395.42, 395.43, 468, 229, 235, 236

(56) References Cited

U.S. PATENT DOCUMENTS

| | | | |
|---|---|---|---|
| 5,684,954 A | * 11/1997 | Kaiserswerth et al. | 709/236 |
| 5,838,677 A | * 11/1998 | Kozaki et al. | 370/389 |
| 6,097,721 A | * 8/2000 | Goody | 370/379 |
| 6,466,572 B1 | * 10/2002 | Ethridge et al. | 370/352 |

OTHER PUBLICATIONS

Ethridge et al. (US PUB 2002/0163921) distributed ethernet hub.*

* cited by examiner

Primary Examiner—Ajit Patel
Assistant Examiner—Yvonne Q. Ha
(74) Attorney, Agent, or Firm—Rabin & Berdo, P.C.

(57) ABSTRACT

A packet communications apparatus which can selectively generate a desired packet signal in response to a transmission permission received from an intranet apparatus is provided. The apparatus includes an access control circuit for receiving a transmission permission signal from the intranet apparatus and generating a transmission command signal to instruct the transmission of the packet signal to a multiplexing circuit to each of a plurality of line units on the basis of the transmission permission signal. Each line unit includes a transmission control circuit for controlling so as to store each packet signal into a buffer on the basis of a header information and transmit the packet signal from the buffer to the multiplexing circuit on the basis of the received transmission command signal. Further, the packet signals including the same identification information are stored into the buffer as one packet signal group. The packet signals are supplied from the buffer to the multiplexing circuit on the basis of the received transmission command signal and identification information.

10 Claims, 9 Drawing Sheets

FIG.9

| TRANSMISSION PERMISSION, ORDER | LINE UNIT #n, VIRTUAL QUEUE NO. |
|---|---|
| (A,1)<br>(A,2)<br>(A,3) . . . | #0, VIRTUAL QUEUE NO. = 1<br>#1, VIRTUAL QUEUE NO. = 1<br>#2, VIRTUAL QUEUE NO. = 3 |
| (B,1)<br>(B,2) . . . | #0, VIRTUAL QUEUE NO. = 2<br>#2, VIRTUAL QUEUE NO. = 1 |
| C . . . | #2, VIRTUAL QUEUE NO. = 2 |

PACKET COMMUNICATIONS CUSTOMER-STATION APPARATUS

BACKGROUND OF THE INVENTION

1. Field of the Invention

The present invention relates to a packet communications apparatus and, more particularly, to a packet communications customer-station apparatus which is used for packet multiplexed communications such as an ATM (Asynchronous Transfer Mode) communications or the like.

2. Description of the Related Art

In recent years, the study of an access network employing the ATM technique is advancing rapidly.

FIG. 1 shows a configuration of an ATM-PON (ATM Passive Optical Network) as an example of an access network using an optical fiber as a transmission path. In the access network 1 in FIG. 1, an ONU (Optical Network Unit) 3 is provided as a customer-station in each subscriber home or office. An OLT (Optical Line Terminator) 5 is provided as an intra-network (intranet) apparatus in a station within the access network 1. An apparatus which serves as an interface of an access system called an OSU (Optical Subscriber Unit) 7 is provided in the OLT 5. The OSU 7 is connected to a star coupler (SC) 9 via an optical fiber 10. The SC 9 is connected to each ONU 3 in a plurality of subscriber homes via the optical fibers 10. For example, the OSU 7 and the SC 9 are connected by one optical fiber. The SC 9 and each ONU 3 are connected by one optical fiber. An upstream (direction from the ONU 3 to the OSU 7) ATM cell signal and a downstream (direction from the OSU 7 to the ONU 3) ATM cell signal are transmitted by a wavelength-multiplexed system using lightwaves of different wavelengths.

Each ONU 3 is constructed by, a common portion 11, a plurality of line cards (LC) 12, and a plurality of LC individual interfaces 13, and is connected to a plurality of terminals 15 by lines 16 via the LC 12. The terminal 15 is, for example, a personal computer, a server, a telephone, a communications apparatus, or a hub 17 to which these apparatuses are connected.

A section including the common portion 11 and the LC individual interfaces 13 of the ONU 3 faces the OSU 7 of the OLT 5 and serves as an interface of the access network 1. The common portion 11 controls the whole of the ONU 3.

User information from each terminal 15 is transmitted to the ONU 3 as ATM cell data or a data stream (i.e., data which is not converted to ATM cells). The LC 12 of the ONU 3 receives the data and performs, if necessary, an ATM cell conversion to the data stream which is not converted to the ATM cells. Between the LC 12 and LC individual interface 13, therefore, all of the user information data transmitted from each terminal 15 is converted to the ATM cells.

In response to the signal of the downstream direction, the LC 12 receives the ATM cells from the common portion 11, performs a dissolving process of the ATM cells if necessary in accordance with the connected terminals 15, and transmits the ATM cells or data stream to each of the terminals 15.

FIG. 2 schematically shows a configuration of the ONU 3. A line apparatus or line unit 20 including the LC 12 and the LC individual interface 13 corresponding to the LC 12 is provided for each line 16. The ATM cells in the upstream direction generated from each LC 12 are supplied to the LC individual interface 13 and stored in an input buffer 22 installed for each LC individual interface 13. A reading request of the ATM cell(s) stored in the input buffer 22 is transferred from each input buffer 22 to a priority control section 23.

In the priority control section 23, a reading order among the input buffers is determined in accordance with pre-assigned priorities and the ATM cells are read out from the input buffer 22 in order of the priorities. The ATM cells read out from the input buffers are multiplexed into one ATM cell stream in a multiplexing section 25. The resultant ATM cell stream is stored in a cell buffer 26.

A cell configuration of 56 bytes or 60 bytes has been proposed so far as an ATM cell format of the downstream signal, in which an overhead (hereinafter, referred to as PON-OH) to perform a control of ATM-PON is added to the ATM cell of 53 bytes. Instead of adding PON-OH, there is also another configuration in which a physical layer OAM cell (hereinafter, referred to as a PLOAM cell) as an OAM (Operation Administration and Maintenance) cell having ATM-PON control information or ONU control information is inserted in the ATM cell stream while the ATM cell is held to be 53 bytes. There is an access control information to control the access in the upstream direction as one of the ATM-PON control information that is carried by the PLOAM cell or PON-OH in the downstream direction. The access control information includes a transmission permission signal indicating which ONU 3 can output the ATM cell at the output time of each ATM cell in the upstream ATM cell stream of the access network.

Each ONU 3 outputs the upstream ATM cells only at the permitted time indicated by the access control information. The ATM cells are generated from a plurality of ONUs 3 at the same time as mentioned above, thereby preventing the ATM cells from colliding each other in the SC 9.

A transmission control section 28 of the ONU 3 extracts the transmission permission signal from the ATM cell stream of the downstream direction. When the transmission permission signal arrived to the ONU 3, the transmission control section 28 supplies a transmission command signal to the cell buffer 26. The ATM cells stored in the cell buffer 26 are read out in response to the command signal. In a case when a PLOAM cell in the upstream direction having response information to the control of the ONU 3 is generated in a PLOAM generating section 29, the PLOAM cell is selected preferentially by a selector (SEL) 30 and is output from the ONU 3. The reading operation from the cell buffer 26 is, therefore, be held until the next transmission permission is received.

Each PLOAM cell or ATM cell in the upstream direction is delayed in a delay circuit 32 by preset delay time for each ONU 3 in order to equalize the transmission delay time between the ONU 3 and the OSU 7 and is transmitted from the cell buffer 26 to the SEL 30. After that, a PON-OH is added to the transmitted cell in a PON-OH adding section 34. The resultant electric signal is converted to a light signal in an E/O converting section 35 and is output from the ONU 3.

In the standardization regarding the ATM-PON specifications, the access control method is also a focus of discussion. A method is proposed wherein a plurality of kinds of transmission permission are included in the access control information which is supplied to each ONU 3. That is, it is intended that the commands to designate various services can be included in the transmission permission, such as a command to designate one of the LCs 12, a command to designate user information such as image, audio, or data, or the like.

According to the conventional configuration shown in FIG. 1, however, the transmission control section 28 can control the cell buffer 26 only for one kind of transmission permission. Since the ATM cells stored in the cell buffer 26 have been multiplexed to one ATM cell stream, the ATM cell stream cannot be separated and it is impossible to cope with the plurality of kinds of service commands as mentioned above.

OBJECTS AND SUMMARY OF THE INVENTION

The present invention is made in consideration of the above problems and it is an object of the invention to provide a packet communications customer-station apparatus (hereinafter, simply referred to as a packet communications apparatus) which can generate a desired packet signal selectively in accordance with a kind of transmission permission received from an intranet apparatus.

To achieve the object, according to one aspect of the present invention, there is provided a packet communications apparatus which comprises a plurality of line units each of which is connected to at least one terminal apparatus and includes a packetizing circuit for packetizing a terminal information signal received from the terminal apparatus to generate a packet signal including a header information segment and a buffer circuit for storing the packet signal, a multiplexing circuit for multiplexing the packet signals stored in the buffer circuits of the plurality of line units and for generating a multiplexed signal, a transmitting circuit for transmitting the multiplexed signal to an intranet apparatus, and an access control circuit for receiving a transmission permission signal from the intranet apparatus and for generating a transmission command signal to instruct the transmission of the packet signals to the multiplexing circuit to each of the plurality of line units on the basis of the transmission permission signal.

According to another aspect of the present invention, each of the plurality of line units includes a packet control circuit for receiving the transmission command signal, and the packet control circuit includes a storage control circuit for storing each of the packet signals to the buffer circuit on the basis of the header information segment, and a transmission control circuit for controlling so as to transmit the packet signal from the buffer circuit to the multiplexing circuit on the basis of the received transmission command signal.

According to further aspect of the present invention, the header information segment includes an identification information segment indicating an identification of a call, the storage control circuit stores the packet signals including the same identification information segment into the buffer circuit as one packet signal group, and the transmission control circuit transmits the packet signals from the buffer circuit to the multiplexing circuit on the basis of the received transmission command signal and the identification information segment.

BRIEF DESCRIPTION OF THE DRAWINGS

FIG. 9 is a diagram for explaining a set table of a packet communications apparatus according to the third embodiment of the present invention.

DETAILED DESCRIPTION OF THE PREFERRED EMBODIMENTS

Figure 1:
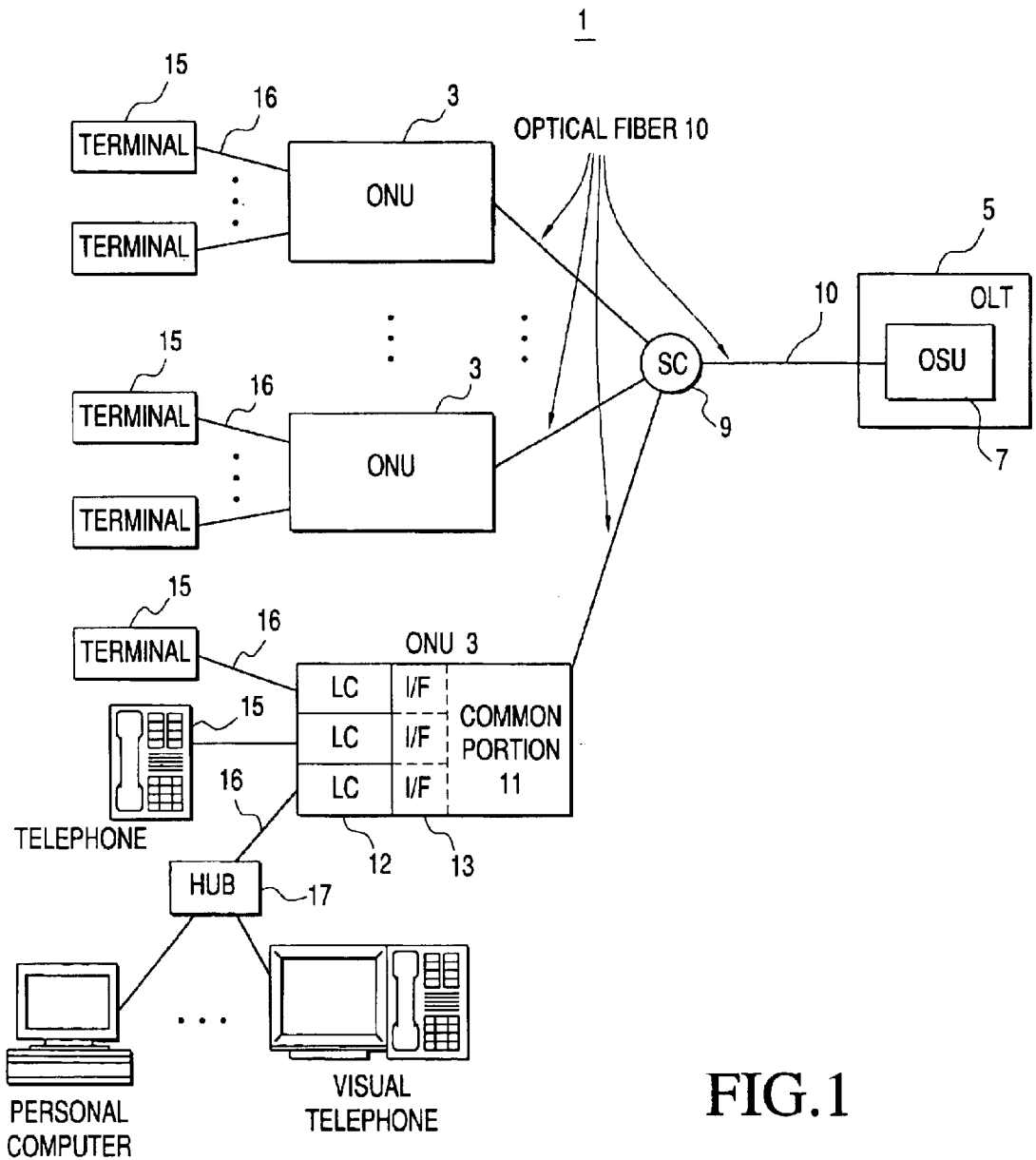
FIG. 1 is a diagram showing an example of a configuration of an ATM-PON access network using an optical fiber as a transmission path.
Figure 2:
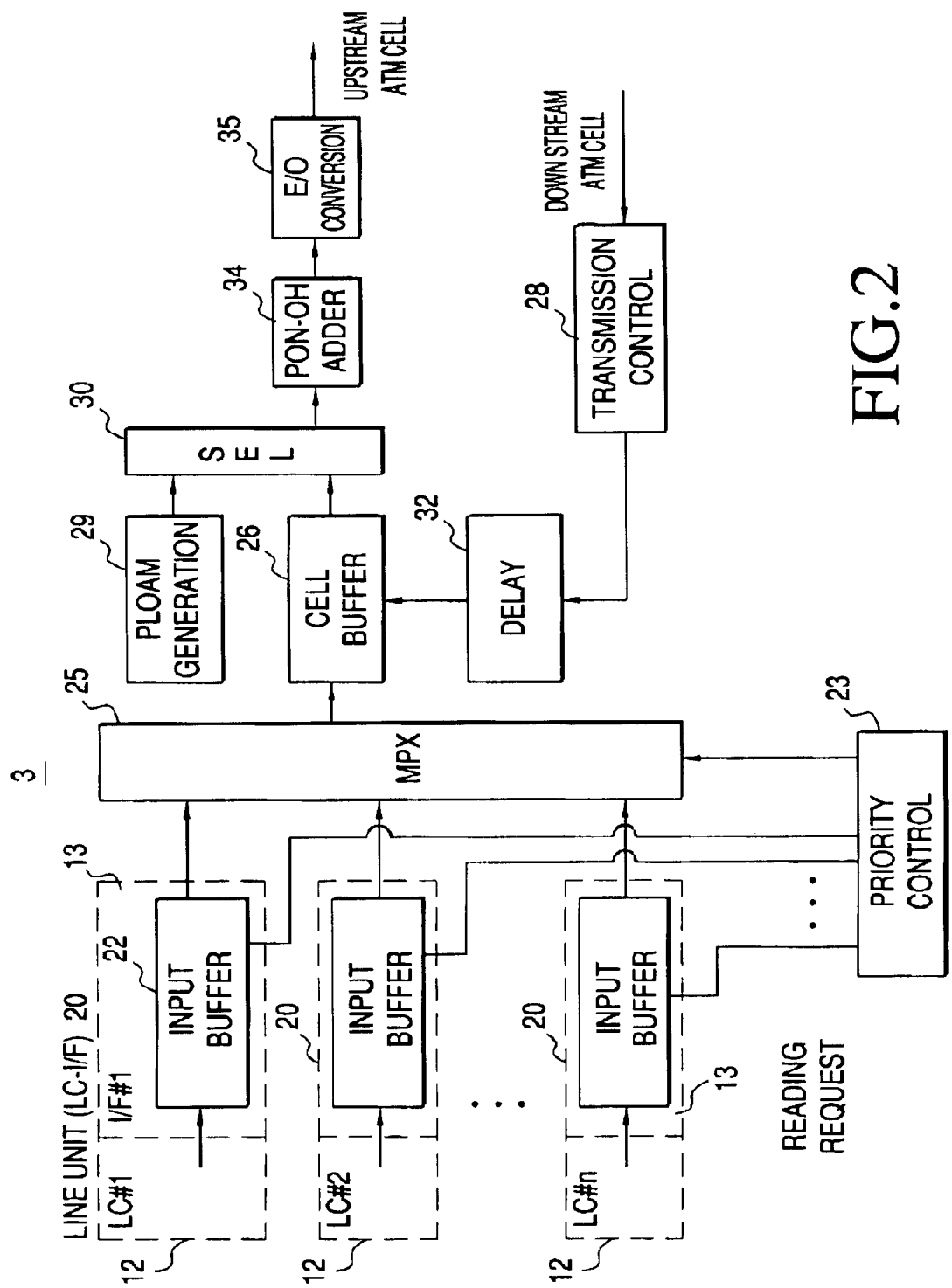
FIG. 2 is a diagram schematically showing a configuration of a conventional ONU.

A packet communications apparatus according to the present invention will now be described in detail hereinbelow with reference to the drawings. The same or substantially the same component elements in the drawings are designated by the same reference numerals.

[First Embodiment]

Figure 3:
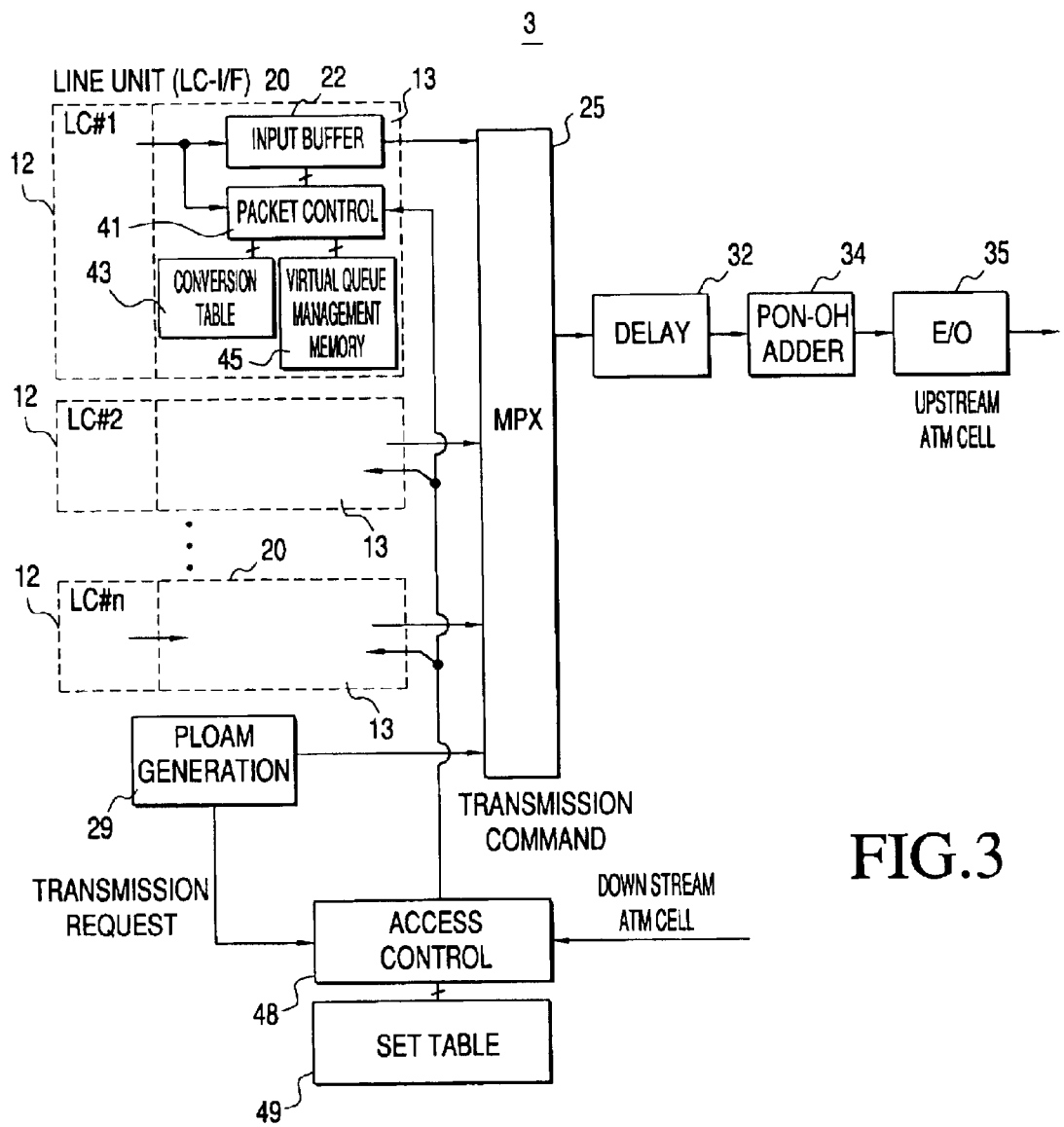
FIG. 3 is a diagram showing a configuration of a packet communications apparatus according to the first embodiment of the present invention.

FIG. 3 is a diagram showing a configuration of a packet communications apparatus 3 according to the first embodiment of the present invention.

In the configuration shown in FIG. 3, each of the line apparatuses or line units 20 is constructed by: the LC 12; the input buffer 22; a packet control section 41 connected to the input buffer 22; and a conversion table memory 43 and a virtual queue number management memory 45 connected to the packet control section 41.

A VPI/VCI (Virtual Path Identifier/Virtual Channel Identifier) in header information as identification information of a call of the supplied ATM cell and a conversion table indicating the correspondence between the VPI/VCI and virtual queue numbers in the input buffer 22 are stored in the conversion table memory 43. As will be explained hereinbelow, the virtual queue is a set of a group of ATM cells having the same VPI/VCI. Addresses for the respective virtual queue numbers are stored in the virtual queue number management memory 45.

The packet control section 41 performs a control regarding the storage of the ATM cell into the input buffer 22 and the transmission from the input buffer 22 on the basis of the data in the conversion table memory 43 and the virtual queue number management memory 45.

According to the present invention, an access control section 48 to extract and analyze the transmission permission from the downstream ATM cell and a set table memory 49 to store a set table indicating the correspondence between the transmission permissions and the virtual queue numbers are provided for the ONU 3.

Further, a multiplexing section 25, a PLOAM generating section 29, a delay circuit 32, a PON-OH adding section 34, and an E/O converting section 35 are provided. The operation of each section of the ONU 3 in the embodiment will be described in detail hereinbelow.

The input buffer 22 has a configuration comprising a plurality of element areas obtained by a set of a data area to hold one ATM cell and an area (hereinafter, referred to as a "next address area") to hold a head address of the area to hold an ATM cell subsequent to the above ATM cell.

In the initial state, each data area is empty or the held data is invalid. The head address of the adjacent element area is stored in each next address area. That is, in the initial state, the element areas are sequentially coupled by the next address areas in the input buffer 22 and to constitute one queue (i.e., a hold queue) of a chain configuration. The queue is referred to as an empty cell queue hereinbelow. A plurality of virtual queues can be constructed in the input buffer 22 during the operation of the apparatus. That is, the element areas are sequentially coupled from the head of each queue in accordance with the contents of the next address area.

The packet control section 41 performs a writing operation and a reading operation of the ATM cells in response to the transmission permission signal from the access control section 48 by using the conversion table memory 43 and the virtual queue number management memory 45.

When the ATM cell is supplied to the input buffer 22, the contents of the ATM cell are held in the head data area (where, the address of the area is assumed to be I0) of the empty cell queue. After the contents are readout, an unused-code is written in the next address area. A virtual queue to be coupled for the element area is determined from the VPI/VCI of the supplied ATM cell. The address I0 is written in the next address area of the last element area of the virtual queue. The element areas are connected in this manner. The number of element areas of the empty cell queue is, thus, reduced by one and the head data area is set to the value of the next address area of the I0 which has been read out in this instance.

When the ATM cell is read-out from the input buffer 22, contrarily, the ATM cell is read out from the head of the virtual queue and the element area after completion of the reading operation is coupled to the end of the empty cell queue.

A head address, an end address, and a virtual queue length are stored in the virtual queue number management memory 45 for every number of each virtual queue. Similarly, a head address, an end address, and a virtual queue length of the empty cell queue are also stored in the virtual queue number management memory 45. That is, the packet control section 41 updates the data regarding storage areas of the virtual queue and the empty cell queue at the time of the writing and reading processes of the ATM cell.

When the communicating operation of the ONU 3 is executed, the access control section 48 extracts the transmission permission from the ATM cell or PLOAM cell of the downstream signal transmitted from the intranet apparatus 5. The access control section 48 converts the extracted transmission permission to the line unit number and the virtual queue number of the line unit 20 which is allowed to generate the ATM cell. A transmission command signal indicating the converted transmission permission is sent to the packet control section 41 of the line unit 20.

The ATM cells read out from the input buffer 22 on the basis of the transmission command signal are supplied to the multiplexing section 25 and are multiplexed to one multiplexed signal. A predetermined delay time is added to the multiplexed signal in the delay circuit 32 and a PON-OH is added to the delayed signal in the PON-OH adding section 34. The resultant signal is, then, sent to the E/O converting section 35. The multiplexed signal is further converted to a light signal of a predetermined wavelength in the E/O converting section 35 and transmitted from the ONU 3 to the intranet apparatus 5.

Figure 4:
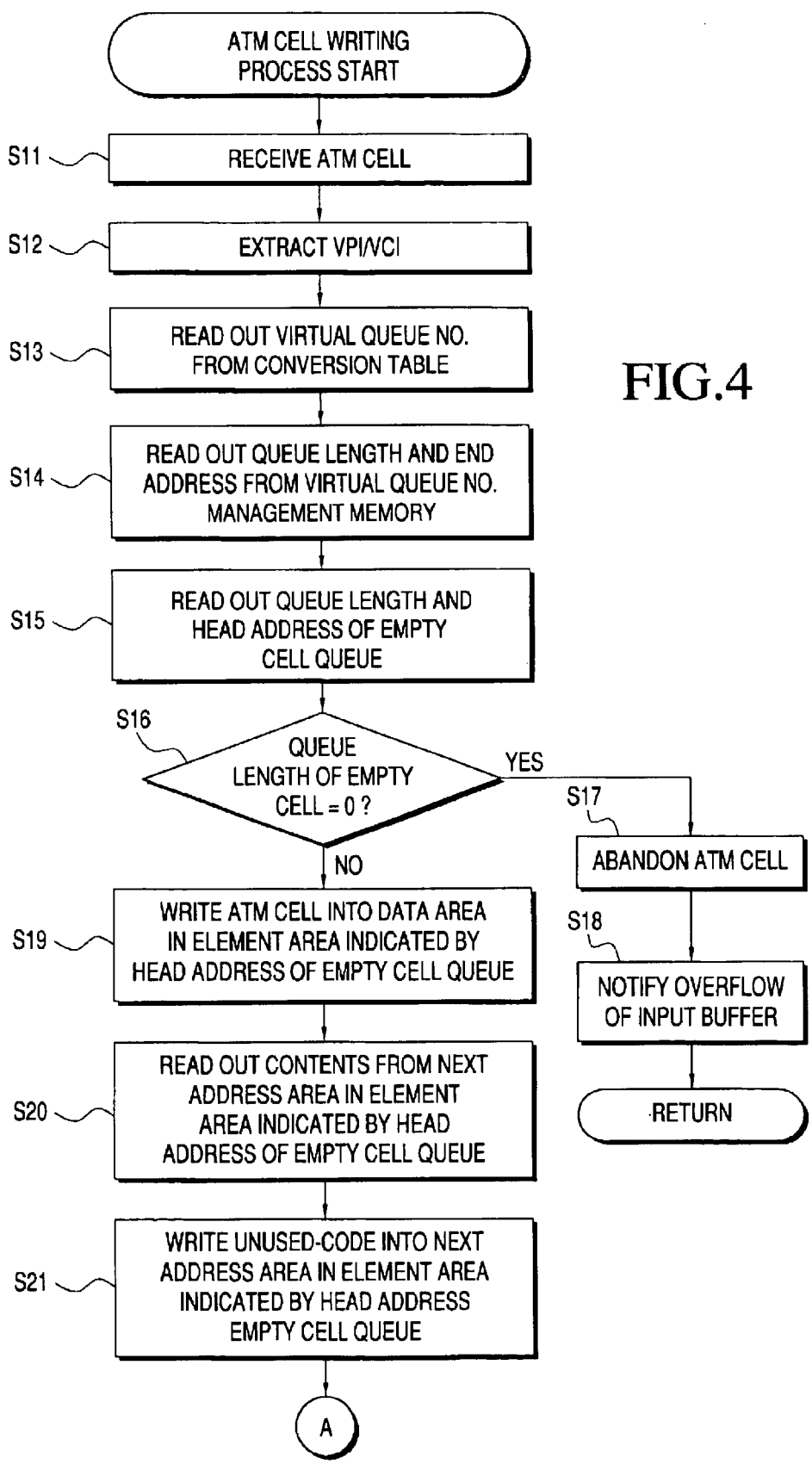
FIG. 4 is a flowchart showing a procedure for a writing process of an ATM cell that is executed by a packet control section according to the present invention.
Figure 5:
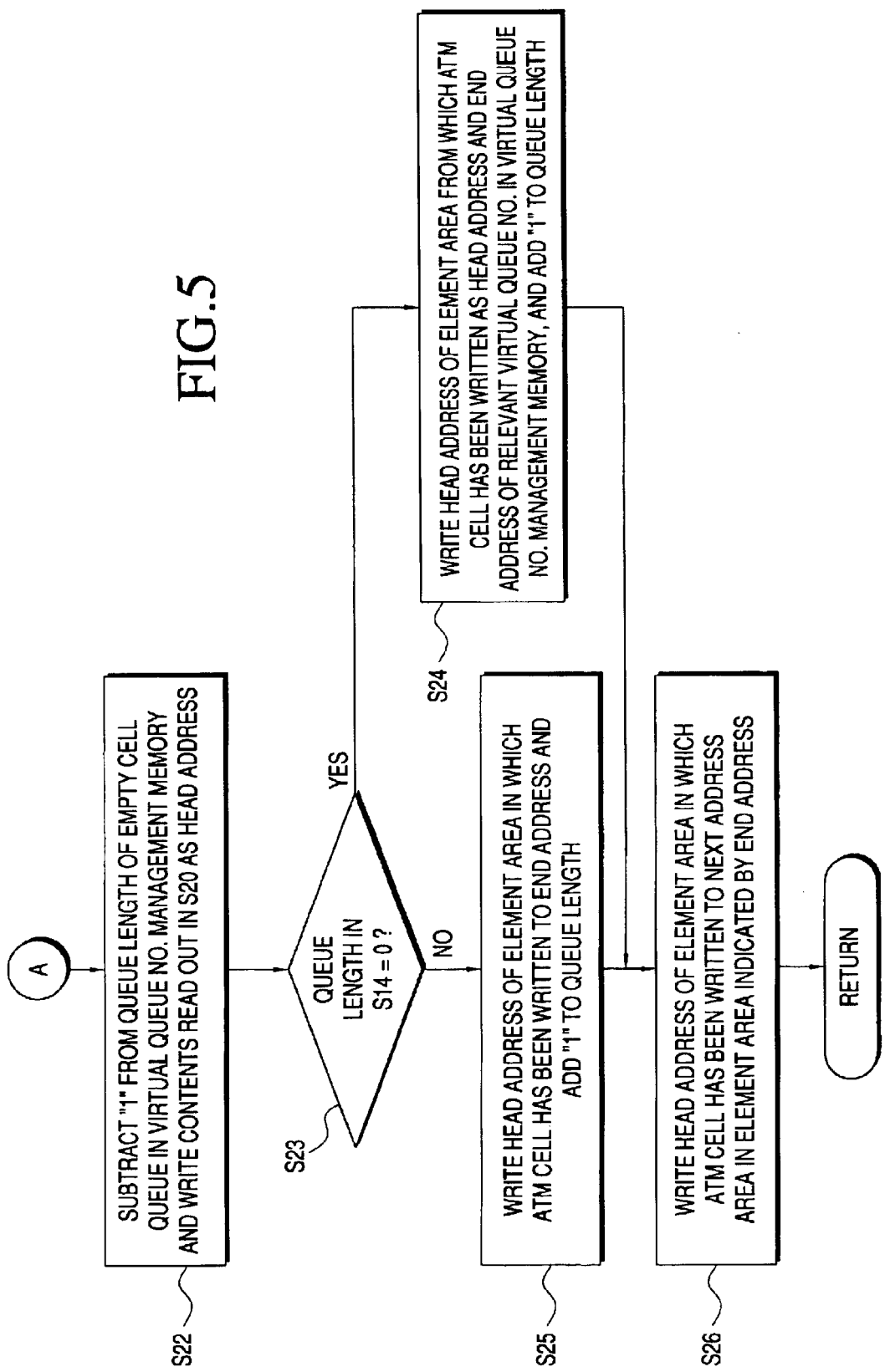
FIG. 5 is a flowchart showing the procedure for a writing process of the ATM cell that is executed by the packet control section according to the present invention.

A writing process of the ATM cell which is executed by the packet control section 41 will now be described with reference to flowcharts shown in FIGS. 4 and 5 with respect to an example in which one ATM cell is supplied to a certain one of the plurality of line units 20.

First, when an ATM cell is supplied (step S11), the packet control section 41 extracts a VPI/VCI in the header of the ATM cell (step S12). The packet control section 41 reads out the virtual queue number from the conversion table on the basis of the VPI/VCI (step S13). It is assumed that the VPI/VCI which is supplied to the line unit 20 and the virtual queue number corresponding to the VPI/VCI have been preset in the conversion table.

When the virtual queue number is determined, the packet control section 41 writes the ATM cell into the input buffer 22 according to the following procedure.

(1) The queue length of the relevant virtual queue number and the end address are read out from the virtual queue number management memory 45 (step S14).

(2) The queue length of the empty cell queue and the head address are read out from the virtual queue number management memory 45 (step S15).

(3-1) Whether the queue length of the empty cell queue is equal to 0 or not is discriminated (step S16). When the queue length is equal to 0, the ATM cell is abandoned (step S17) because the ATM cell cannot be input to the input buffer 22. An overflow of the input buffer 22 is notified to an apparatus monitoring control section (not shown) for monitoring an operating status of the ONU 3 (step S18). The writing process is terminated.

(3-2) When the queue length of the empty cell queue is equal to or larger than 1, the supplied ATM cell is written in the data area of the element area indicated by the head address of the empty cell queue (step S19).

(4) The contents are read out from the next address area of the element area indicated by the head address of the empty cell queue (step S20). (The contents indicate the next element area of the empty cell queue).

(5) An unused-code is written in the next address area of the element area shown by the head address of the empty cell queue (step S21).

(6) Only "1" is subtracted from the queue length of the empty cell queue of the virtual queue number management memory 45 and the contents read out in step S20 are written as a head address (step S22).

(7-1) Whether the queue length read out in step S14 is equal to 0 or not is discriminated (step S23). When it is equal to 0, the head address of the element area where the ATM cell has been written in step S19 is written as the head address and the end address of the relevant virtual queue number of the virtual queue number management memory 45 and "1" is added to the queue length (step S24).

(7-2) When the queue length read out in step S14 is equal to or larger than 1, the head address of the element area where the ATM cell has been written in step S19 is written in the end address and "1" is added to the queue length (step S25).

(8) The head address of the element area where the ATM cell has been written in step S19 is written in the next address area of the element area indicated by the end address read out in step S14 (step S26).

The ATM cell supplied as mentioned above consumes one element area from the empty cell queue, is coupled to one of the virtual queues, and held in the input buffer 22.

Figure 6:
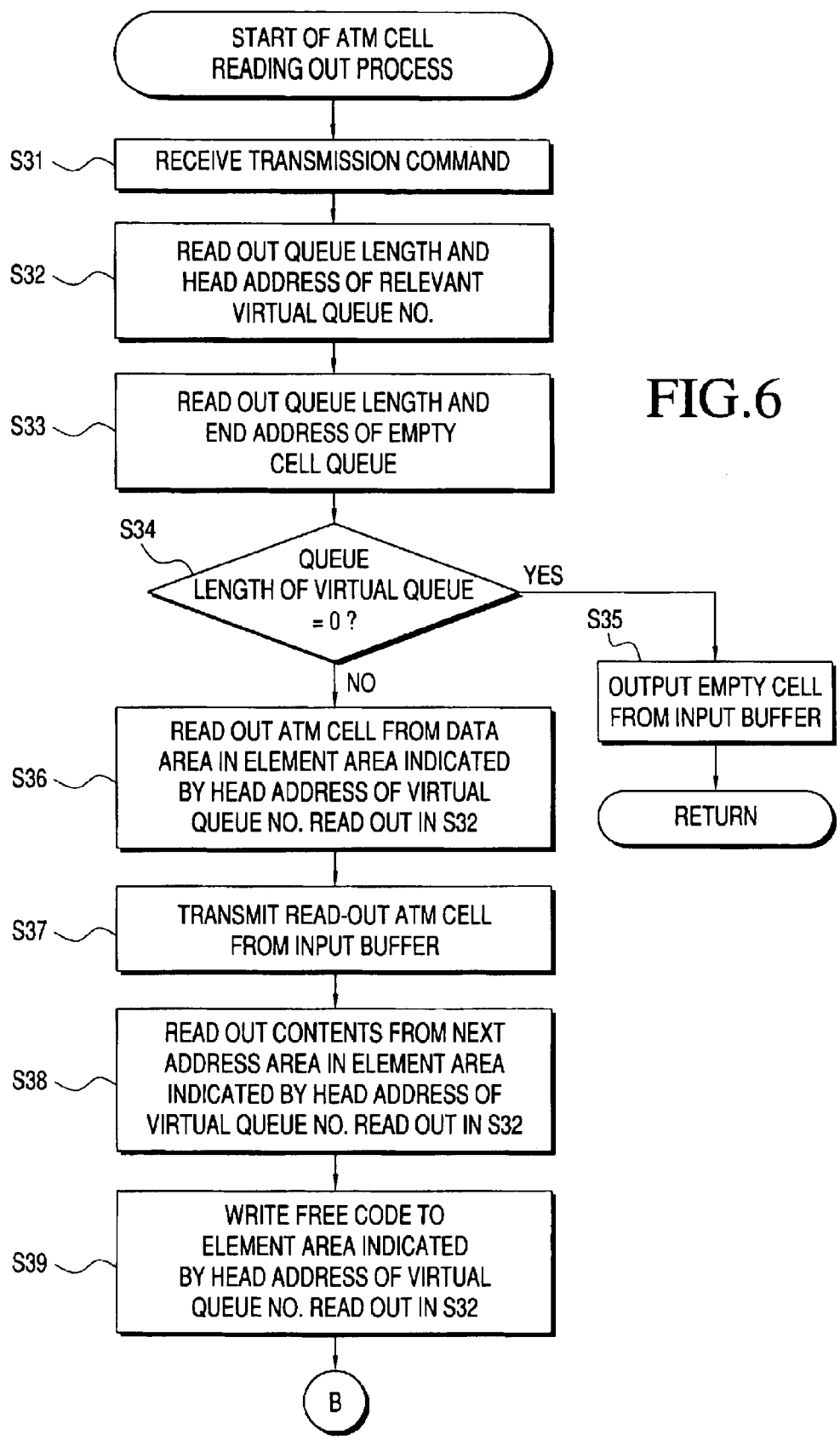
FIG. 6 is a flowchart showing a procedure for a reading process of an ATM cell that is executed by the packet control section according to the present invention.
Figure 7:
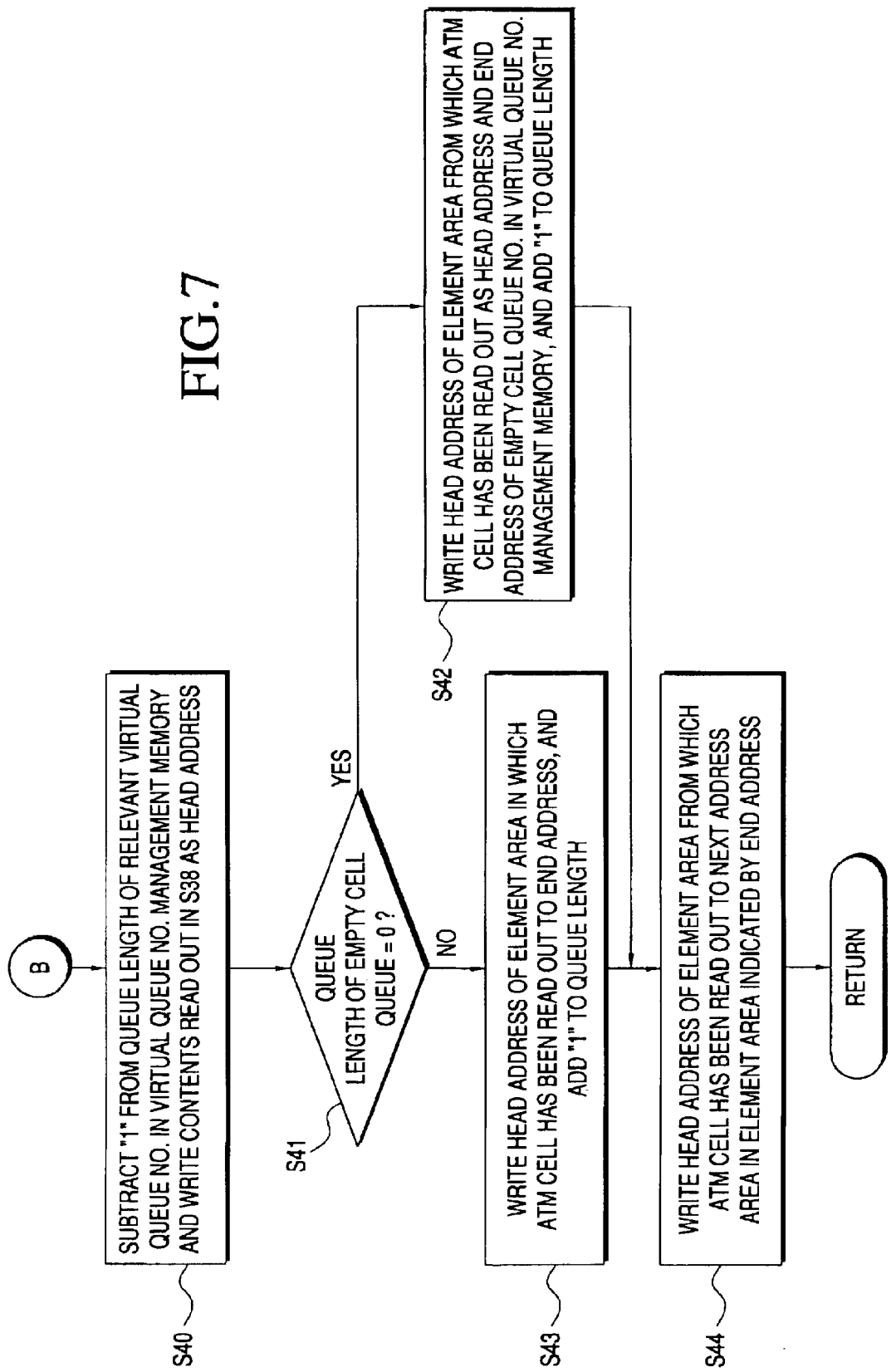
FIG. 7 is a flowchart showing the procedure for a reading process of the ATM cell that is executed by the packet control section according to the present invention.

A reading process of the ATM cell which is executed by the packet control section 41 will now be described with reference to flowcharts shown in FIGS. 6 and 7.

First, the access control section 48 extracts the transmission permission toward its own ONU 3 from the signal in the downstream direction as mentioned above. The access control section 48 converts the extracted transmission permission to the line unit 20 from which the ATM cell should be generated, and converts it to the virtual queue number designated in the line unit 20. The transmission command signal indicating the converted transmission permission is transmitted to the packet control section 41 of the relevant line unit 20.

The packet control section 41 receives the transmission command (step S31) and operates so as to read out the ATM cell designated by the transmission command.

The packet control section 41 reads out the ATM cell from the virtual queue corresponding to the transmission command received by the following procedure.

(1) The queue length of the relevant virtual queue number and the head address are read out from the virtual queue number management memory 45 (step S32).
(2) The queue length of the empty cell queue and the end address are read out from the virtual queue number management memory 45 (step S33).
(3-1) Whether the queue length of the relevant virtual queue number is equal to 0 or not is discriminated (step S34). When it is equal to 0, since the ATM cell to be read out does not exist in the input buffer 22, the empty cell is generated from the input buffer 22 (step S35). The reading process is finished.
(3-2) When the queue length of the relevant virtual queue number is equal to or larger than 1, the ATM cell is read out from the data of the element area shown by the head address of the virtual queue number read out in step S32 (step S36). The read-out ATM cell is generated from the input buffer 22 (step S37).
(4) The contents are read out from the next address area of the element area indicated by the head address of the virtual queue number read out in step S32 (step S38). (The contents indicates the next element area of the virtual queue.)
(5) An unused-code is written in the next address area of the element area indicated by the head address of the virtual queue number read out in step S32 (step S39).
(6) Only "1" is subtracted from the queue length of the virtual queue number read out in step S32 in the virtual queue number management memory 45 and the contents read out in step S38 are written as a head address (step S40).
(7-1) Whether the queue length of the empty cell queue is equal to 0 or not is discriminated (step S41). When the queue length is equal to 0, the head address of the element area from which the ATM cell has been read out in step S36 is written as a head address and an end address of the empty cell queue number of the virtual queue number management memory 45, and "1" is added to the queue length (step S42).
(7-2) When the queue length read out in step S33 is equal to or larger than 1, the head address of the element area from which the ATM cell has been read out in step S36 is written in the end address and "1" is added to the queue length (step S43).
(8) The head address of the element area from which the ATM cell has been read out in step S36 is written in the next address area of the element area indicated by the end address read out in step S33 (step S44).

The ATM cell is read out from the input buffer 22 as mentioned above and the element area from which the ATM cell was read out is couples to the empty cell queue and is used to hold the next ATM cell that is supplied.

The operation in the case where there is the PLOAM cell in the upstream direction will be further explained.

When there is the PLOAM cell in the upstream direction, the PLOAM generating unit 29 transmits a transmission request to the access control section 48.

When the transmission permission is received, if there is the transmission request of the PLOAM cell, the access control section 48 most preferentially handles the transmission request and controls the transmission command so as to temporarily suspend the reading operation of the ATM cell from the input buffer 22.

In this manner, only one ATM cell or PLOAM cell is supplied to the multiplexing section 25 and, after that, it is multiplexed to one cell stream in the multiplexing section 25. A multiplexed signal is transmitted from the ONU 3 to the intranet apparatus 5 via the delay circuit 32, the PON-OH adding section 34, and the E/O converting section 35.

Setting of the data into the set table memory 49, the conversion table memory 43, and the virtual queue number management memory 45 in response to the transmission permission can be made as follows. For example, in the case where the user wants to generate the ATM cell from a specific LC 12 in the upstream direction in response to a certain transmission permission, first, the kind of transmission permission, and the corresponding line unit 20 from which the user wants to generate the ATM cell in the upstream direction and the virtual queue number is set into the set table memory 49. Then, setting of the conversion table memory 43 of the relevant line unit 20 and the virtual queue number management memory 45 should be made.

The conversion table memory 43 can be easily realized by using a CAM (associative read memory). When the number of virtual queues is small, an ordinary SRAM (static RAM) can be used. In this case, all addresses in an SRAM (static RAM) can be scanned each time the ATM cell is supplied.

As mentioned above, according to the present invention, since a plurality of kinds of transmission permission can be set to one ONU, the transmission permission can be made correspondent to the ATM cell freely which the user wants to generate in the upstream direction. That is, the packet communications apparatus which can selectively generate a desired ATM cell in accordance with the kind of received transmission permission can be realized.

According to the present invention, the head address and the end address are managed by using the memory for managing the virtual queue. The addresses are updated in accordance with the writing process and the reading process, and the storage area in the input buffer is used on the basis of the update. The storage area in the input buffer can be used for any virtual queue, therefore, there is no need of preparing a physical area for each virtual queue. Thus, the necessary memory capacity and the size of the circuit can be reduced.

[Second Embodiment]

Figure 8:
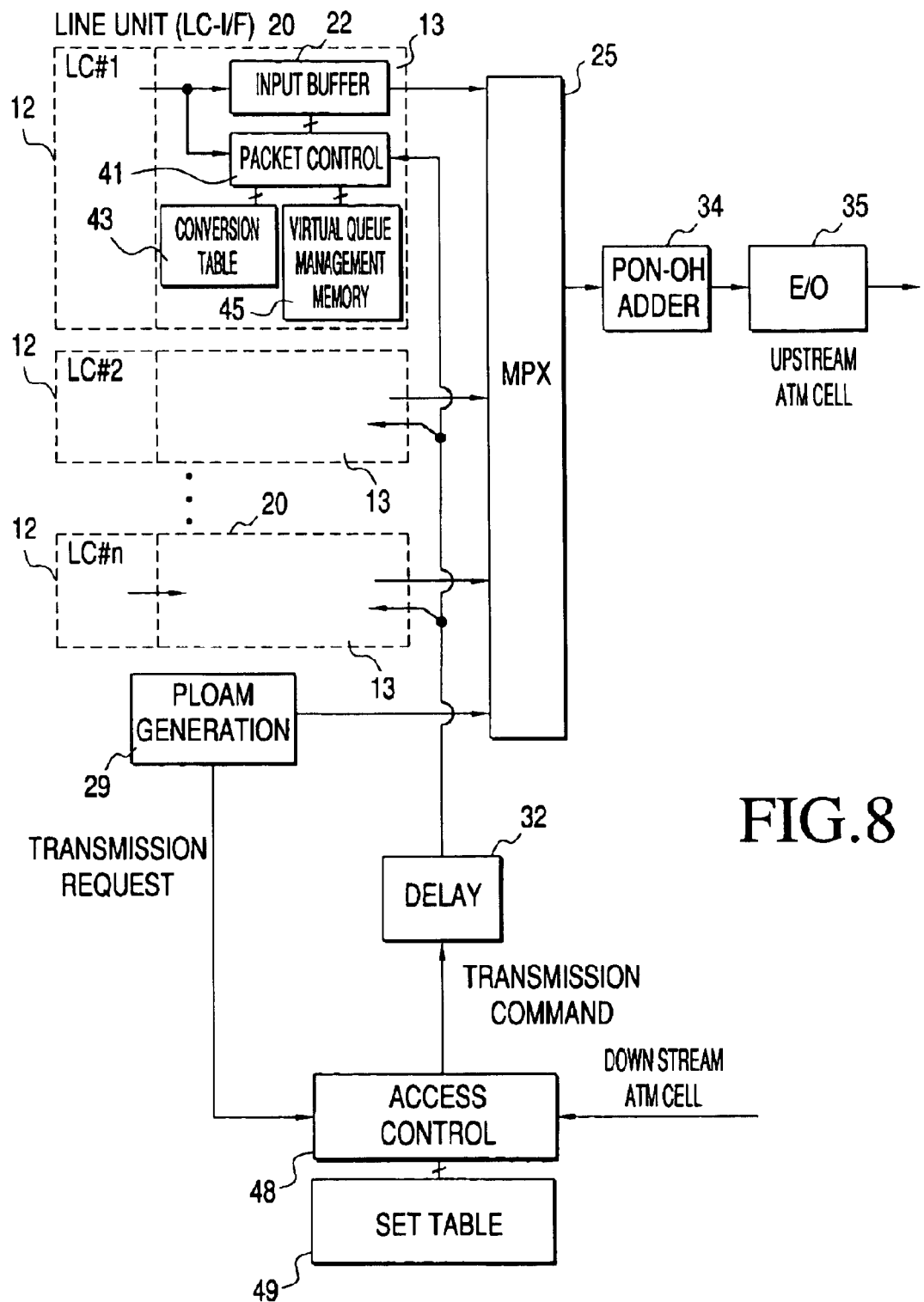
FIG. 8 is a diagram showing a configuration of a packet communications apparatus according to the second embodiment of the present invention.

FIG. 8 is a diagram showing a configuration of the packet communications apparatus 3 according to the second embodiment of the present invention.

The second embodiment differs from the first embodiment in that the delay circuit 32 provided between the multiplexing section 25 and the PON-OH adding section 34 in the first embodiment is removed and the delay circuit 32 to delay the transmission command signal is provided between the access control section 48 and the line unit 20.

That is, in the configuration shown in FIG. 8, the delay circuit 32 delays the transmission command signal by a predetermined delay time and transfers it to the packet control section 41. Even if the delay circuit 32 is constructed as mentioned above, the effect that is obtained in the first embodiment is not reduced.

An advantage of the second embodiment is that the memory capacity that is needed in the delay circuit 32 can be reduced. That is, when the transmission command signal is delayed in the delay circuit 32, if the transmission permission is further received from the downstream signal while holding the transmission command signal, the delay circuit 32 needs to keep the transmission command signal which was further received and converted. Since the transmission command signal is constructed by approximate one byte at most, however, the memory capacity which is necessary for the delay circuit 32 for this purpose is equal to an approximate value of (the number of cells for the waiting time)×(one byte).

According to the second embodiment, therefore, the memory capacity of the delay circuit 32 can be remarkably reduced and a high efficiency and miniaturization of the apparatus can be realized.

[Third Embodiment]

FIG. 9 is a diagram showing a set table which is set in the set table memory 49 of the packet communications apparatus 3 according to the third embodiment of the present invention.

According to the present invention, as shown in FIG. 9, a set table comprising combinations each of which is constructed by the kind of transmission permission, line unit 20, and virtual queue number is provided and priorities are further assigned to each combination.

The kinds of the transmission permission A, B, and C indicate, for example, image information, audio information, and data, respectively. The correspondence relations among the transmission permission, the number of the line unit 20, and the virtual queue number have been predetermined between the packet communications apparatus 3 and intranet apparatus 5. In the case shown in FIG. 9, the line units 20 corresponding to the transmission permission A are the line units #0, #1, and #2. It is also shown that the image information has been stored in the virtual queue numbers "1", "1", and "3" of the input buffers 22 in those line units 20, respectively. Similarly, the line units 20 corresponding to the transmission permission B are the line units #0 and #2 and the audio information has been stored in the virtual queue numbers "2" and "1" in the line units, respectively. The line unit 20 corresponding to the transmission permission C is the line unit #2 and the data has been stored in the virtual queue number "2" in the line unit.

In this embodiment, when the transmission permission "A" is received, the access control section 48 generates a transmission command to designate the virtual queue number "1" of the line unit #0 in which the combination (transmission permission, order) of the transmission permission and the order is shown by (A, 1) on the basis of the set table and gives it to the line unit 20. The access control section 48 stores (A, 1) simultaneously with the transmission of the transmission command.

When the transmission permission "A" is received again, subsequently, "1" as an order of the transmission permission "A" is read out from the storing apparatus, "1" is added to it, and the set table is referred to by (A, 2). The transmission command is added to the virtual queue number "1" of the line unit #1 from the set table and "2" is written into the storing apparatus.

In the case where the setting such that no order is combined to the transmission permission "C" has previously been stored, for example, the set table is referred to only by the transmission permission "C" in response to the reception of the transmission permission "C", and the transmission permission is given to the virtual queue number "2" of the line unit #2.

As described above, according to the present invention, the correspondence relation between each of a plurality of kinds of transmission permission and the combinations of the line units 20 and the virtual queue numbers is used and the priorities are preset with respect to the combinations. Even when the same kind of transmission permission is received, therefore, by generating the cells in accordance with the priorities, the transmission commands are not concentrated on a specific line unit 20, so that the transmission control of a high degree of freedom in selection can be realized.

Although the present invention has been described with respect to the example in the case where it is applied to the customer-station multiplexing apparatus which is used in the access network, the present invention can be applied to a packet multiplexing apparatus for performing a general TDMA (time division multiple access).

According to the present invention as described above, since the apparatus has the access control circuit for generating the transmission command signal to transmit the packet signal to the multiplexing circuit to each of a plurality of line units on the basis of the transmission permission received from the intranet apparatus, the packet communications apparatus which can selectively output a desired packet signal of a desired line unit can be realized.

According to the present invention, the packet signals including the same identification information segments are stored as one packet signal group and the transmission control circuit transmits the packet signal from the buffer circuit on the basis of the received transmission command signal and identification information segment, so that a small and efficient apparatus can be realized.

The present invention has been described with reference to the preferred embodiments thereof. It should be understood by those skilled in the art that a variety of alternations and modifications may be made from the embodiments described above. It is therefore contemplated that the appended claims encompass all such alternations and modifications.

What is claimed is:

1. A packet communications apparatus for performing packet communications with an intranet apparatus via a communication line, comprising:

a plurality of line units each of which is connected to at least one terminal apparatus and includes a packetizing circuit for packetizing a terminal information signal received from said terminal apparatus to generate a packet signal including a header information segment and a buffer circuit for storing said packet signal;

a multiplexing circuit for multiplexing said packet signals stored in said buffer circuits of said plurality of line units and for generating a multiplexed signal;

a transmitting circuit for transmitting said multiplexed signal to said intranet apparatus over said communication line; and an access control circuit for receiving a transmission permission signal from said intranet apparatus to designate one of said plurality of line units in accordance with the contents of said transmission permission signal, and for generating a transmission command signal to provide to each of said plurality of line units, the transmission command signal instructing the transmission of said packet signals stored in the buffer circuit of said designated line unit to said multiplexing circuit.

2. An apparatus according to claim 1, wherein each of said plurality of line units includes a packet control circuit for receiving said transmission command signal, and said packet control circuit includes a storage control circuit for storing each of said packet signals to said buffer circuit on the basis of said header information segment, and a transmission control circuit for controlling transmission of said packet signal from said buffer circuit to said multiplexing circuit on the basis of said received transmission command signal.

3. An apparatus according to claim 2, wherein said header information segment includes an identification information segment indicating an identification of a call, said storage control circuit stores the packet signals including the same identification information segment into said buffer circuit as one packet signal group, and said transmission control circuit transmits said packet signals from said buffer circuit to said multiplexing circuit on the basis of said received transmission signal and said identification information segment.

4. An apparatus according to claim 1, wherein said transmission command signal includes a line unit designation information segment to designate one of said plurality of line units.

5. An apparatus according to claim 3, wherein said transmission command signal includes a packet signal group designation information segment to designate one of said packet signal groups stored in said plurality of line units.

6. An apparatus according to claim 5, wherein said access control circuit includes means for storing a priority regarding each of said packet signal groups and generates said transmission command signal on the basis of said priority and said transmission permission signal.

7. An apparatus according to claim 1, further comprising a delay circuit for delaying said transmission command signal by a predetermined time and for relaying the delayed signal to each of said plurality of line units.

8. An apparatus according to claim 3, wherein said packet control circuit includes means for storing information regarding said packet signal group and corresponding areas of said buffer circuit in which the packet signals of said packet signal group are stored as an area information segment and means for updating said area information segment in accordance with the transmission of said packet signals, and said storage control circuit stores a new packet signal into said buffer circuit on the basis of the updated area information segment.

9. An apparatus according to claim 1, wherein said transmission permission signal includes a line unit designation information segment which designates one of said plurality of line units.

10. An apparatus according to claim 1, wherein said transmission permission signal includes a data type designation information which designates a type of data to be transmitted, and said access control circuit selects at least one of said plurality of line units in accordance with the data type designation information.

* * * * *